United States Patent
Endou (10) Patent No.: US 10,509,389 B2
(45) Date of Patent: Dec. 17, 2019

(54) WARM UP OPERATION PLANNING DEVICE AND WARM UP OPERATION PLANNING METHOD

(71) Applicant: FANUC CORPORATION, Minamitsuru-gun, Yamanashi (JP)

(72) Inventor: Takahiro Endou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/918,293

(22) Filed: Mar. 12, 2018

(65) Prior Publication Data
US 2018/0292805 A1 Oct. 11, 2018

(30) Foreign Application Priority Data
Apr. 6, 2017 (JP) .................................. 2017-075970

(51) Int. Cl.
G05B 19/404 (2006.01)
(52) U.S. Cl.
CPC .. *G05B 19/404* (2013.01); *G05B 2219/49102* (2013.01)
(58) Field of Classification Search
None
See application file for complete search history.

(56) References Cited

U.S. PATENT DOCUMENTS

| 2007/0213867 | A1  | 9/2007  | Prust et al. |
| 2009/0129793 | A1* | 5/2009  | Milton ............... G03G 21/0011 399/38 |
| 2015/0112503 | A1* | 4/2015  | Matsumoto ........... G05B 15/02 700/299 |
| 2015/0338841 | A1* | 11/2015 | Fujimoto ............. G05B 19/401 700/195 |

FOREIGN PATENT DOCUMENTS

| JP | 61-65753     | 4/1986 |
| JP | 2002-91538   | 3/2002 |
| JP | 2008-093738  | 4/2008 |

(Continued)

OTHER PUBLICATIONS

Notification of Reasons for Refusal dated Jan. 8, 2019 in corresponding Japanese Patent Application No. 2017-075970.

*Primary Examiner* — Ziaul Karim
(74) *Attorney, Agent, or Firm* — Wenderoth, Lind & Ponack, L.L.P.

(57) ABSTRACT

A warm up operation planning device that generates a warm up operation plan for a machine tool comprises: a warm up operation program memory in which at least one warm up operation program is stored; a machining plan input unit that inputs a machining plan for a work in a predetermined period; a warm up operation program selection unit that selects the warm up operation program responsive to the state of the machine tool; a warm up operation duration determination unit that determines a warm up operation duration in response to the work; and a warm up operation planning unit that calculates start time and finish time of warm up operation based on the machining plan. The warm up operation program selection unit selects the warm up operation program responsive to the work from the warm up operation program memory.

6 Claims, 7 Drawing Sheets

(56) References Cited

FOREIGN PATENT DOCUMENTS

| | | |
|---|---|---|
| JP | 2008-264883 | 11/2008 |
| JP | 2009-125905 | 6/2009 |
| JP | 2011-156657 | 8/2011 |
| JP | 2012-043184 | 3/2012 |
| JP | 2012-091261 | 5/2012 |
| JP | 2013-134563 | 7/2013 |
| JP | 2015-080835 | 4/2015 |
| JP | 2015-223635 | 12/2015 |
| JP | 2016-13605 | 1/2016 |

* cited by examiner

WARM UP OPERATION PLANNING DEVICE AND WARM UP OPERATION PLANNING METHOD

This application is based on and claims the benefit of priority from Japanese Patent Application No. 2017-075970, filed on 6 Apr. 2017, the content of which is incorporated herein by reference.

BACKGROUND OF THE INVENTION

Field of the Invention

The present invention relates to a warm up operation planning device for a machine tool. The present invention particularly relates to a warm up operation planning device and a warm up operation planning method for allowing more efficient warm up operation.

Related Art

Prior to machining on a work, operation what is called warm up operation has been performed in a machine tool. The machine tool performs operation such as machining on the work by operating rotation drive means such as a main spindle motor, for example. In this operation, heat is generated from the rotation drive means itself or from a part operated by the rotation drive means. Hence, if the machine tool starts machining while the machine tool is still in a cold condition, temperature increase may cause thermal displacement in a shaft, for example, due to the generated heat to cause deviation between the position of the work and that of a tool relative to each other. In this case, machine accuracy may be reduced.

Warm up operation has been performed as one of methods generally employed for responding to such reduction in machine accuracy due to the thermal displacement. Warm up operation is to perform idle running of the machine tool in advance until the machine tool reaches saturation temperature before the machine tool starts machining after being powered on, instead of proceeding to the machining immediately after the powering on. By performing warm up operation and starting machining on the work after each part reaches stable temperature, more stable machine accuracy can be obtained.

Figure 7:
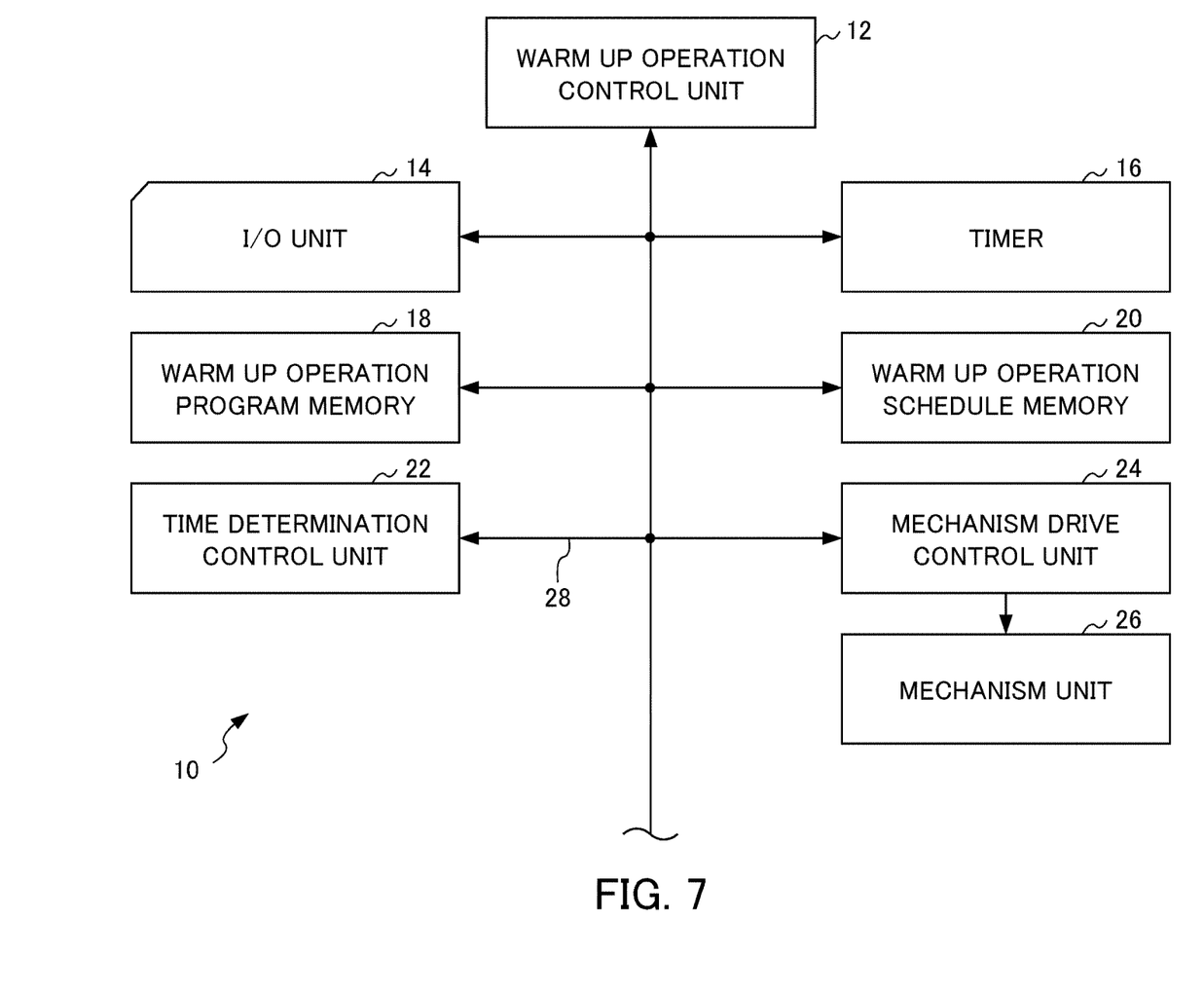
FIG. 7 is a configuration block diagram of a conventional warm up operation planning device.

FIG. 7 shows an example of a configuration block diagram of a conventional warm up operation planning device 10. As shown in FIG. 7, the conventional warm up operation planning device 10 includes a warm up operation control unit 12, an I/O unit 14, a timer 16, a warm up operation program memory 18, a warm up operation schedule memory 20, a time determination control unit 22, a mechanism drive control unit 24, and a mechanism unit 26. These units except the mechanism unit 26 are mutually connected through a bus 28. The conventional warm up operation planning device 10 may be configured as a computer. In this case, each structure and each function of the warm up operation planning device 10 are realized by a program, a CPU for executing the program, and each hardware for constituting the computer.

The warm up operation control unit 12 is means for controlling warm up operation. The I/O unit 14 is means functioning as an interface with the outside. The timer 16 measures time. The warm up operation control unit 12 is allowed to start and finish warm up operation at predetermined time by referring to the timer 16. The warm up operation program memory 18 stores one or more warm up operation programs. The warm up operation schedule memory 20 stores a schedule for warm up operation. The time determination control unit 22 compares the timer 16 and the schedule for warm up operation in the warm up operation schedule memory 20, and determines whether or not time has come to start or finish warm up operation.

If the time determination control unit 22 determines that time has come to start (or finish) a predetermined warm up operation schedule by referring to the timer 16, the time determination control unit 22 transmits a message to this effect to the warm up operation control unit 12. If the warm up operation control unit 12 receives this message (a message indicating start, for example), the warm up operation control unit 12 reads a predetermined warm up operation program from the warm up operation program memory 18 based on this warm up operation schedule, and executes the read program. As a result of execution of this program, the warm up operation control unit 12 controls the mechanism drive control unit 24 to drive the mechanism unit 26, thereby starting warm up operation. The process described herein is for starting warm up operation. Process for finishing warm up operation is performed in the same way. The warm up operation planning device 10 shown in FIG. 7 is a conventionally-known device that performs predetermined warm up operation on a machine tool based on a predetermined schedule.

Prior Patent Documents

Patent document 1 mentioned below discloses an operation function controller for a machine tool including a device for turning on a main power supply of the machine tool, a device for turning off the main power supply of the machine tool, and a device for determining time of switching off an operation function of the machine tool by following a selectable standard. Patent document 2 mentioned below discloses a method of generating a long-term machining schedule (covering a period from time several months before start of machining to time several weeks before the start) and a short-term machining schedule (covering a period from time immediately before start of machining to time several weeks before the start) separately, based on external information including model plan information, drawing release information, material shipment information, external product shipment information, and part shipment information.

Patent document 3 mentioned below discloses a technique by which a warm up operation schedule set in a memory and a value of a built-in timer are compared. If the schedule and the timer value agree with each other, a predetermined signal is output. A predetermined warm up operation program is read and executed based on the output signal. Patent document 4 mentioned below disclose a technique of acquiring ambient temperature of a machine tool and giving a warm up operation command suitable for the ambient temperature. Patent document 4 recites that, by giving such a command, warm up operation optimum for the ambient temperature is performed. Patent document 4 refers to ambient humidity in addition to the ambient temperature. Patent document 5 mentioned below discloses a controller for a machine tool that drives a motor in response to warm up operation of the machine tool, calculates the state of thermal displacement in the machine tool, and compares the calculated state to a target thermal displacement state. If these states agree with each other, the controller stops the motor in response to finish of the warm up operation. Patent document 5 recites that such behavior achieves reduction in warm up operation.

Patent Document 1: Japanese Unexamined Patent Application, Publication No. 2011-156657
Patent Document 2: Japanese Unexamined Patent Application, Publication No. 2002-91538
Patent Document 3: Japanese Unexamined Patent Application, Publication No. S61-65753
Patent Document 4: Japanese Unexamined Patent Application, Publication No. 2015-223635
Patent Document 5: Japanese Unexamined Patent Application, Publication No. 2016-13605

SUMMARY OF THE INVENTION

As described above, there have been conventional systems for performing warm up operation of a machine tool by following an input plan for warm up operation (patent documents 3 and 4, for example). However, to use such systems, an operator himself or herself is required to generate a warm up operation plan and input the plan itself. Effect of warm up operation depends on external environment where a machine tool is placed. For example, an optimum warm up operation duration of a machine tool changes in a manner that depends on season (temperature or humidity) or the working state of the machine tool of the day before. This makes it difficult for the above-described conventional systems to maintain constant accuracy in warm up operation.

The present invention has been made in view of the above-described problem. The present invention is intended to increase production efficiency by reducing downtime caused by warm up operation of a machine tool. The present invention is also intended to contribute to reduction in power consumption by reducing excessive warm up operation of the machine tool.

To solve the above-described problem, according to the present invention, a warm up operation program optimum for each edge (a machine unit including a machine tool responsible for an individual task, an NCU, a driving device, etc.) at a factory where machine tools are installed, is selected, and start time and finish time of warm up operation are determined. More specifically, the present invention has the following features.

A warm up operation program is selected and a warm up operation duration is calculated based on a production plan for the factory, and a warm up operation plan for each edge is generated.

A past working state of each edge, a measurement result about machine accuracy of a work, etc. are stored into a database. Environmental information such as temperature, humidity, etc. in the factory or around the edge may be retrieved.

A more correct warm up operation duration may be calculated based on the retrieved environmental information.

The present invention having these features employs the following configuration:

(1) A warm up operation planning device according to the present invention ("warm up operation planning device 100" described later, for example) generates a warm up operation plan for a machine tool for machining on a work as a machining target. The warm up operation planning device comprises: a warm up operation program memory ("warm up operation program memory 208" described later, for example) in which association is recorded between at least one warm up operation program, work information, and a warm up operation duration set in advance in the warm up operation program; a machining plan input unit ("machining plan input unit 202" described later, for example) that inputs a machining plan for a work to be machined by the machine tool; a warm up operation program selection unit ("warm up operation program selection unit 210" described later, for example) that selects the warm up operation program recorded in the warm up operation program memory based on the machining plan; a warm up operation duration determination unit ("warm up operation duration determination unit 222" described later, for example) that calculates a warm up operation duration based on the warm up operation program selected by the warm up operation program selection unit; a warm up operation planning unit ("warm up operation planning unit 212" described later, for example) that generates a warm up operation plan for the machine tool by calculating start time and finish time of warm up operation based on the input machining plan and the warm up operation duration determined by the warm up operation duration determination unit; and a warm up operation schedule memory ("warm up operation schedule memory 204" described later, for example) that stores the warm up operation plan.

(2) The warm up operation planning device described in (1) may comprise a working state recording memory ("working state recording memory 218" described later, for example) in which a past operating state of the machine tool is recorded. The warm up operation duration determination unit may calculate the warm up operation duration based on a most recent working state of the machine tool recorded in the working state recording memory.

(3) The warm up operation planning device described in (1) or (2) may comprise: an external environment measurement unit ("external environment measurement unit 216" described later, for example) that acquires an external environment state of the machine tool; and an external environment recording memory ("external environment recording memory 216b" described later, for example) in which the external environment state acquired by the external environment measurement unit is recorded. The warm up operation duration determination unit may calculate the warm up operation duration based on the external environment state of the machine tool recorded in the external environment recording memory.

(4) The warm up operation planning device described in any one of (1) to (3) may comprise: a machine accuracy measurement unit ("machine accuracy measurement unit 220" described later, for example) that measures machine accuracy of the work and stores a measurement result; and a warm up operation duration correction unit ("warm up operation duration correction unit 223" described later, for example) that corrects the warm up operation duration in the warm up operation program recorded in the warm up operation program memory in association with the warm up operation program based on the measurement result about the work measured by the machine accuracy measurement unit.

(5) The warm up operation planning device described in any one of (1) to (4) may comprise a warm up operation execution unit ("warm up operation execution unit 224" described later, for example) that performs warm up operation of the machine tool by following the warm up operation plan stored in the warm up operation schedule memory.

(6) A warm up operation planning method according to the present invention ("warm up operation planning method" described later, for example) generates a warm up operation plan for a machine tool for machining on a work by using a computer. The computer comprises: a warm up operation program recording step ("warm up operation program recording step" described later, for example) of recording association between at least one warm up operation program, work information, and a warm up operation duration set in advance in the warm up operation program; a machining plan input step ("machining plan input step" described later, for example) of inputting a machining plan for a work to be machined by the machine tool; a warm up operation program selection step of selecting the warm up operation program recorded by the warm up operation program recording step based on the machining plan input by the machining plan input step; a warm up operation duration determination step ("warm up operation duration determination step" described later, for example) of calculating a warm up operation duration based on the warm up operation program selected by the warm up operation program selection step; and a warm up operation planning step ("warm up operation planning step" described later, for example) of generating a warm up operation plan for the machine tool by calculating start time and finish time of warm up operation based on the machining plan input by the machining plan input step and the warm up operation duration calculated by the warm up operation duration determination step.

According to the present invention, production efficiency can be increased by reducing downtime caused by warm up operation of a machine tool. Further, contribution to reduction in power consumption can be made by reducing excessive warm up operation of the machine tool.

DETAILED DESCRIPTION OF THE INVENTION

An embodiment of the present invention will be described below in detail based on the drawings.
<System Configuration>

Figure 1:
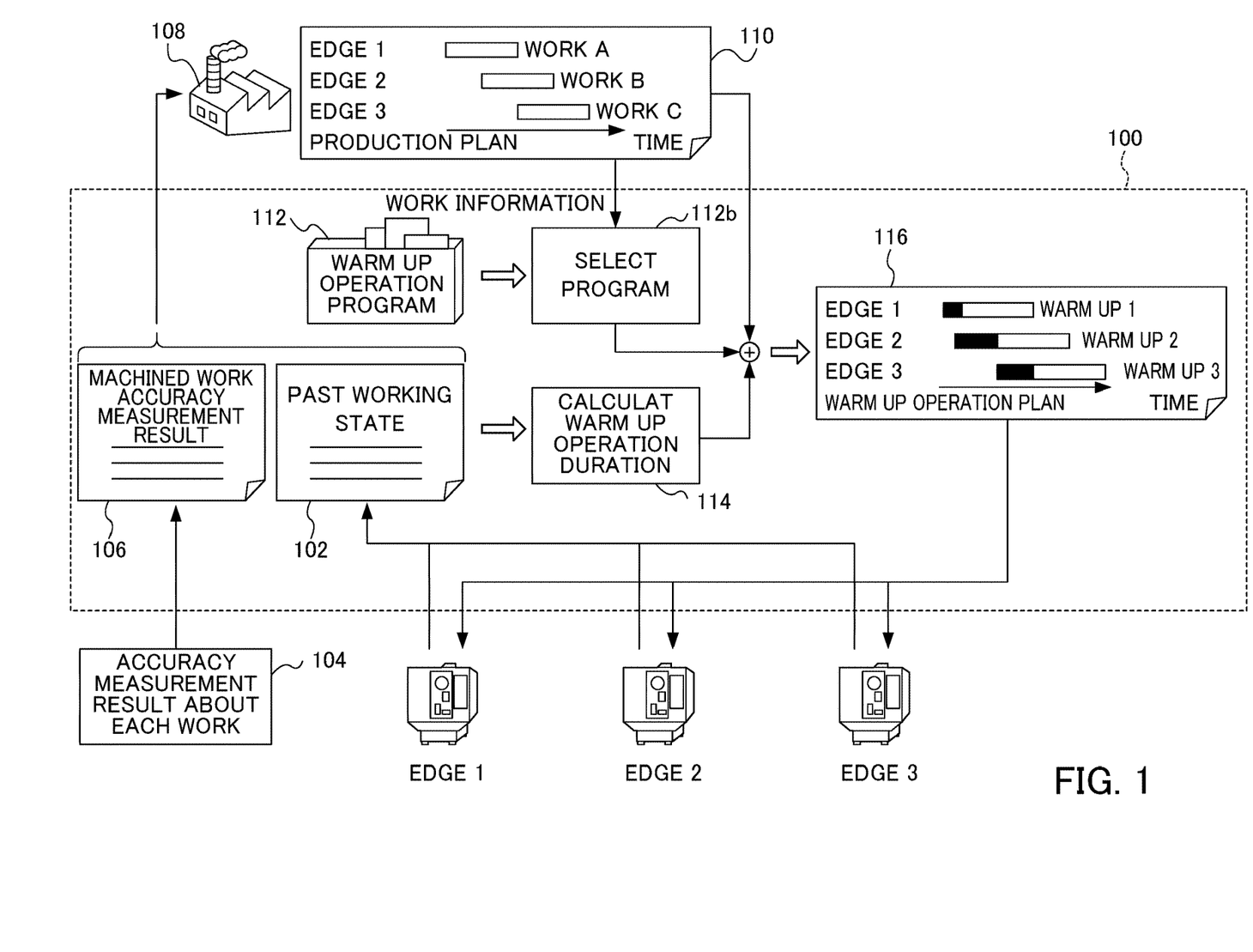
FIG. 1 is a system configuration diagram showing an example of a system according to an embodiment of the present invention.

FIG. 1 is a system configuration diagram showing a processing flow in a system in outline using a warm up operation planning device according to this embodiment. As shown in FIG. 1, a warm up operation planning device 100 monitors the working states of an edge 1, an edge 2, and an edge 3, and stores a past working state 102. The warm up operation planning device 100 retrieves an accuracy measurement result 104 about each work as a result of machining to store machined work accuracy measurement result 106. The past working state 102 and the machined work accuracy measurement result 106 are provided to a production planning unit 108. The production planning unit 108 generates a production plan 110 based on these pieces of information. As schematically shown in FIG. 1, the production plan 110 is generated so as to make the edge 1 machine a work A, to make the edge 2 machine a work B, and to make the edge 3 machine a work C, for example.

The warm up operation planning device 100 stores one or more warm up operation programs 112. The warm up operation planning device 100 refers to the generated production plan 110 to select a corresponding warm up operation program 112b based on a work to be machined defined in the warm up operation program 112b. The warm up operation planning device 100 calculates a warm up operation duration 114 based on a past working state, for example. The warm up operation planning device 100 adds the warm up operation program 112 and additionally, adds the warm up operation duration 114 to the production plan 110 to determine a warm up operation plan 116. Then, the warm up operation planning device 100 supplies the determined warm up operation plan 116 to each of the edges 1 to 3 to make each of the edges 1 to 3 carry out a task in the production plan including the warm up operation. The working state of each of the edges 1 to 3 is stored again as the past working state 102. The accuracy of a machined work is stored into the machined work accuracy measurement result 106. Then, the same processes are performed repeatedly. FIG. 1 illustrates the warm up operation planning device 100 in terms of the processing flow in the warm up operation planning device 100. The specific configuration of the warm up operation planning device 100 will be described in the following chapters.
<Configuration>

Figure 2:
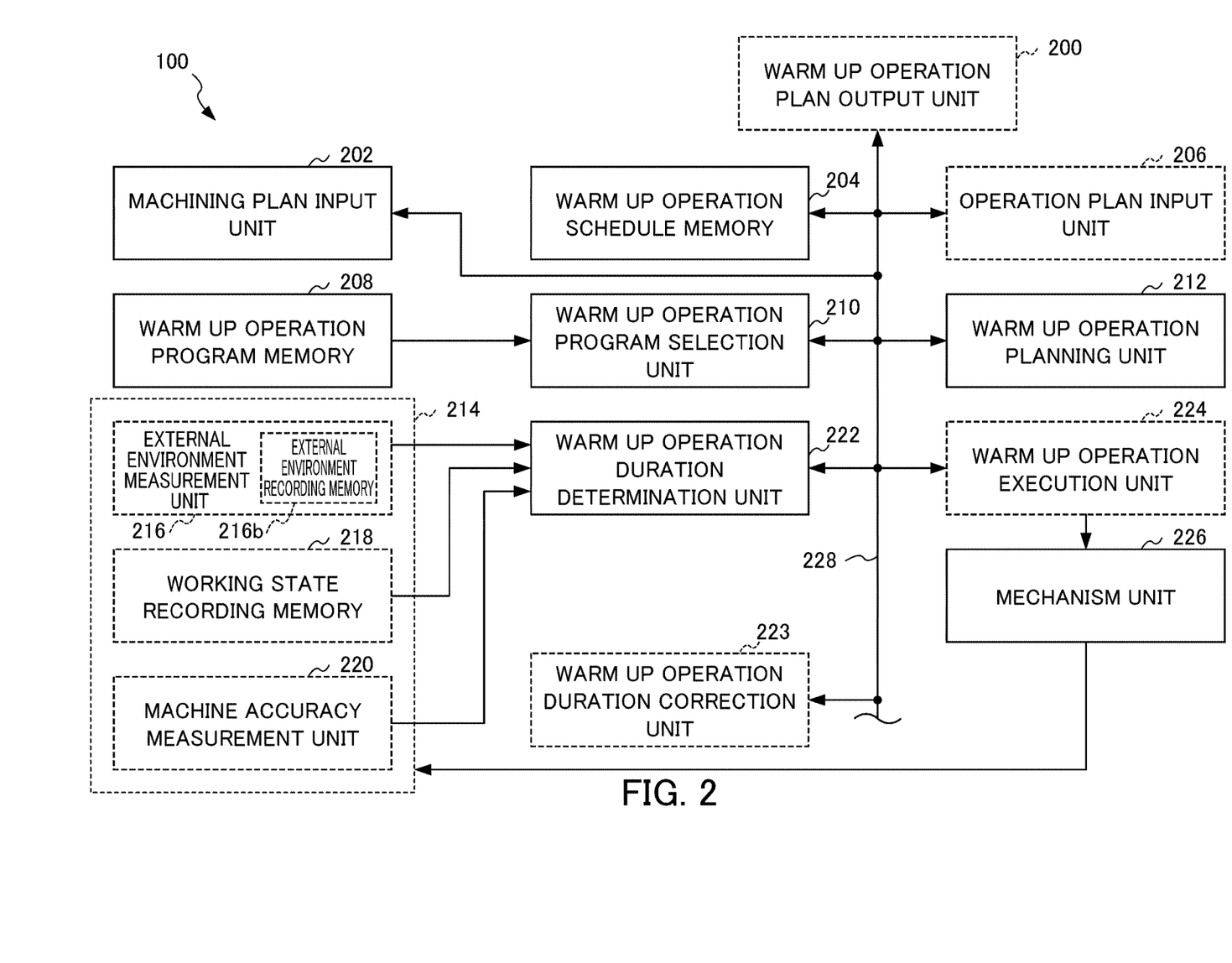
FIG. 2 is a configuration block diagram of a warm up operation planning device according to the embodiment of the present invention.

FIG. 2 is a configuration block diagram of the warm up operation planning device 100 according to this embodiment. As shown in FIG. 2, the warm up operation planning device 100 includes a machining plan input unit 202, a warm up operation schedule memory 204, a warm up operation program memory 208, a warm up operation program selection unit 210, a warm up operation planning unit 212, a warm up operation duration determination unit 222, and a mechanism unit 226. These units are essential configurations (essential elements) for the warm up operation planning device 100 and are shown by solid lines in FIG. 2. The warm up operation planning device 100 may include the following units shown by dashed lines in FIG. 2: a warm up operation plan output unit 200, an operation plan input unit 206, an external environment measurement unit 216, an working state recording memory 218, a machine accuracy measurement unit 220, a warm up operation duration correction unit 223, and a warm up operation execution unit 224. These units shown by dashed lines in FIG. 2 are optional configurations (additional elements). Configurations characteristic to this embodiment (new configurations that cannot be found conventionally) include the warm up operation plan output unit 200, the operation plan input unit 206, the warm up operation program selection unit 210, the warm up operation planning unit 212, the external environment measurement unit 216, the working state recording memory 218, the warm up operation duration determination unit 222, the warm up operation duration correction unit 223, and the warm up operation execution unit 224.

The warm up operation planning device 100 includes a bus 228. The warm up operation plan output unit 200, the machining plan input unit 202, the warm up operation schedule memory 204, the operation plan input unit 206, the warm up operation program selection unit 210, the warm up operation planning unit 212, the warm up operation duration determination unit 222, and the warm up operation execution unit 224 are mutually connected through the bus 228.

The warm up operation plan output unit 200 is means that outputs a warm up operation plan generated by the warm up operation planning device 100 to the outside. The warm up operation plan output unit 200 may be realized by various interfaces of the computer.

The machining plan input unit 202 is means that inputs a machining plan about a work in a predetermined period. The machining plan input unit 202 inputs a machining plan generated outside. The machining plan contains information prepared for each machine tool. This information is about a work to be machined by this machine tool. The machining plan input unit 202 can be realized by various interfaces of the computer.

The warm up operation schedule memory 204 is storage means that stores a warm up operation plan generated by the warm up operation planning unit 212. The warm up operation schedule memory 204 may be realized by using various types of storage means such as semiconductor storage means, for example.

The operation plan input unit 206 is operation plan input means that retrieves an operation plan input from the outside. The operation plan input unit 206 may be realized by using various computer interfaces, for example, for retrieving an operation plan from the outside.

The warm up operation program memory 208 is storage means that stores at least one warm up operation program. The warm up operation program memory 208 may be realized by using various types of storage means such as semiconductor storage means, for example. The warm up operation program memory 208 is configured to store a warm up operation program, information about a work corresponding to this warm up operation program, and cycle time in this warm up operation program (a default of a warm up operation duration set in advance for the warm up operation program) in association with each other. If the cycle time of a particular machine tool has a significant difference from its default, this cycle time may be determined in association with the particular machine tool. Cycle time can be determined arbitrarily. For example, a maximum of a warm up operation duration may be employed as cycle time.

The warm up operation program selection unit 210 is means that selects a warm up operation program responsive to the state of a machine tool.

More specifically, the warm up operation program selection unit 210 selects a warm up operation program corresponding to a work to be machined from the warm up operation program memory 208 based on information about the work to be machined by the machine tool contained in a machining plan. The warm up operation program selection unit 210 may select a warm up operation program based on an operation plan input by the operation plan input unit 206.

The warm up operation planning unit 212 is means that calculates start time and finish time of warm up operation. The warm up operation planning unit 212 determines when warm up operation is to be started and to be finished based on a machining plan input by the machining plan input unit 202. The warm up operation planning unit 212 may determine start time and finish time of warm up operation based on a warm up operation program selected by the warm up operation program selection unit 210 in addition to this machining plan. The warm up operation planning unit 212 stores a warm up operation plan including the start time and the finish time determined in this way into the warm up operation schedule memory 204.

The external environment measurement unit 216 is means that acquires external environment state information. The external environment measurement unit 216 may acquire external environment state information by various methods. The external environment measurement unit 216 may acquire temperature or humidity around a machine tool by using various sensors provided in the machine tool. The external environment measurement unit 216 may acquire external environment state information by using various other sensors or other measurement means. The external environment measurement unit 216 may record the acquired external environment state information into an external environment recording memory 216*b*. The working state recording memory 218 is means that stores a past working state about each machine tool. The working state recording memory 218 may be realized by using various storage units such as semiconductor storage means or magnetic recording means, for example. The machine accuracy measurement unit 220 measures the accuracy of machining by each machine tool on a work machined by this machine tool by measuring the machine accuracy of the work machined at the time of start of machining operation by this machine tool and the machine accuracy of the work machined at the time of finish of the machining operation by this machine tool. The machine accuracy measurement unit 220 stores a measurement result into the working state recording memory 218, for example. More specifically, the machine accuracy measurement unit 220 calculates the amount and direction of deviation between a machining position on the work machined at the time of start of the machining operation and a machining position on the work machined at the time of finish of the machining operation, and stores a result of the calculation into the working state recording memory 218, for example. As described above, the external environment measurement unit 216 (external environment recording memory 216*b*), the working state recording memory 218, and the machine accuracy measurement unit 220 form a warm up operation duration determining parameter unit 214. The warm up operation duration determining parameter unit 214 may acquire various types of information about a machine tool from the mechanism unit 226.

The warm up operation duration determination unit 222 is means that determines a warm up operation duration. The warm up operation duration determination unit 222 basically calculates a warm up operation duration based on a work to be machined. However, the warm up operation duration determination unit 222 may calculate a warm up operation duration based on different types of information. More specifically, the warm up operation duration determination unit 222 may calculate a warm up operation duration based on information about a work to be machined or various types of information contained in the above-described warm up operation duration determining parameter unit 214.

For example, the warm up operation duration determination unit 222 may refer to cycle time (a default of a warm up operation duration set in advance for a warm up operation program) recorded in association with the warm up operation program in the warm up operation program memory 208, and employ this cycle time.

For example, the warm up operation duration determination unit 222 may calculate a warm up operation duration so as to reduce the warm up operation duration (from the default) further as the machine tool worked for a longer duration and as a power supply was cut for a shorter duration last time (most recently). A working duration or a power supply cutoff duration, and a warm up operation duration to be reduced (which may be a reduction rate) responsive to the working duration or the power supply cutoff duration, may be set in advance in a table in association with each other.

This association table may be generated based on experiment of an operator of a machine tool, for example. Alternatively, an association function may be set in advance to be used for calculating a reduced duration (which may be a reduction rate) based on a duration during which the machine tool worked or a duration during which the power supply was cut last time (most recently). While the machine tool operation duration and the power supply cutoff duration are described as indicating the last working state, only one of these durations may be considered. Alternatively, different types of operation information may be considered. Further, a warm up operation duration may be calculated in consideration of a past working state other than a most recent working state, in addition to the last (most recent) working state. As described above, if a maximum of a warm up operation duration is employed as cycle time, for example, this cycle time is used as it is if the machine tool operated for a long duration and the power supply was cut for a short duration last time (most recently).

The warm up operation duration determination unit 222 may determine a warm up operation duration based on an external environment state measured by the external environment measurement unit 216 or based on an external environment state acquired from the external environment recording memory 216b recorded by the external environment measurement unit 216. More specifically, the warm up operation duration determination unit 222 calculates an operation duration in a warm up operation program based on an external environment state such as ambient temperature around a machine tool or coolant temperature, for example. The external environment state information may contain various types of environmental information such as temperature, humidity, and atmospheric pressure. The external environment state information may also contain various types of information such as oil temperature and motor temperature, for example, in addition to the above-described coolant temperature. The warm up operation duration determination unit 222 calculates a warm up operation duration by referring to cycle time recorded in the warm up operation program memory 208 in association with the corresponding warm up operation program. For example, if ambient temperature or coolant temperature is high, the warm up operation duration determination unit 222 may calculate a warm up operation duration in such a manner that the warm up operation duration becomes shorter than the cycle time. Ambient temperature or coolant temperature, and a warm up operation duration to be reduced (which may be a reduction rate) responsive to the ambient temperature or the coolant temperature, may be set in advance in a table in association with each other. This association table may be generated based on experience of an operator of a machine tool, for example. Alternatively, an association function may be set in advance to be used for calculating a reduced duration (which may be a reduction rate) based on ambient temperature or coolant temperature, for example. If ambient temperature or coolant temperature is lower than a predetermined value, a warm up operation duration may be determined to be longer than the cycle time.

The warm up operation duration correction unit 223 corrects cycle time in a warm up operation program recorded in the warm up operation program memory 208 in association with this warm up operation program based on a measurement result obtained about each machine tool by the machine accuracy measurement unit 220 including the machine accuracy of a work machined at the time of start of machining operation by this machine tool and the machine accuracy of the work machined at the time of finish of the machining operation by this machine tool. The warm up operation duration correction unit 223 corrects cycle time associated with the warm up operation program for each machine tool (a default of a warm up operation duration set in advance for the warm up operation program) based on the amount and direction of deviation stored in the working state recording memory 218 between a machining position on the work machined at the time of start of the machining operation and a machining position on the work machined at the time of finish of the machining operation. In this case, the warm up operation duration correction unit 223 records at least the corrected cycle time in association with the machine tool. The warm up operation duration determination unit 222 may employ the corrected cycle time. More specifically, if the deviation between the machining position on the work machined at the time of start of the machining operation and the machining position on the work machined at the time of finish of the machining operation acts in a direction in which the machine tool is expanded, the warm up operation duration correction unit 223 determines that a warm up operation duration is insufficient. In this case, the warm up operation duration correction unit 223 increases cycle time associated with the warm up operation program for each machine tool. Conversely, if the deviation between the machining position on the work machined at the time of start of the machining operation and the machining position on the work machined at the time of finish of the machining operation acts in a direction in which the machine tool is shrunk, the warm up operation duration correction unit 223 determines that a warm up operation duration is excessively long. In this case, the warm up operation duration correction unit 223 reduces cycle time associated with the warm up operation program for each machine tool. The warm up operation duration correction unit 223 calculates the amount of correction of cycle time in a manner that depends on the magnitude of deviation. By doing so, a machine tool can be managed finely for which a warm up operation duration having a significant difference from a default is to be set.

The warm up operation execution unit 224 controls a machine tool to make the machine tool perform warm up operation based on a warm up operation plan generated by the warm up operation planning unit 212. More specifically, the warm up operation execution unit 224 starts warm up operation by following a warm up operation plan stored in the warm up operation schedule memory 204.

The mechanism unit 226 acquires the working state of a machine tool, environment in which the machine tool is placed (various types of temperatures), etc., and feeds the acquired information to the warm up operation duration determining parameter unit 214. By doing so, the warm up operation duration determining parameter unit 214 is allowed to acquire and store various types of information.

Example 1 (First Calculation of Warm Up Operation Duration)

Figure 3:
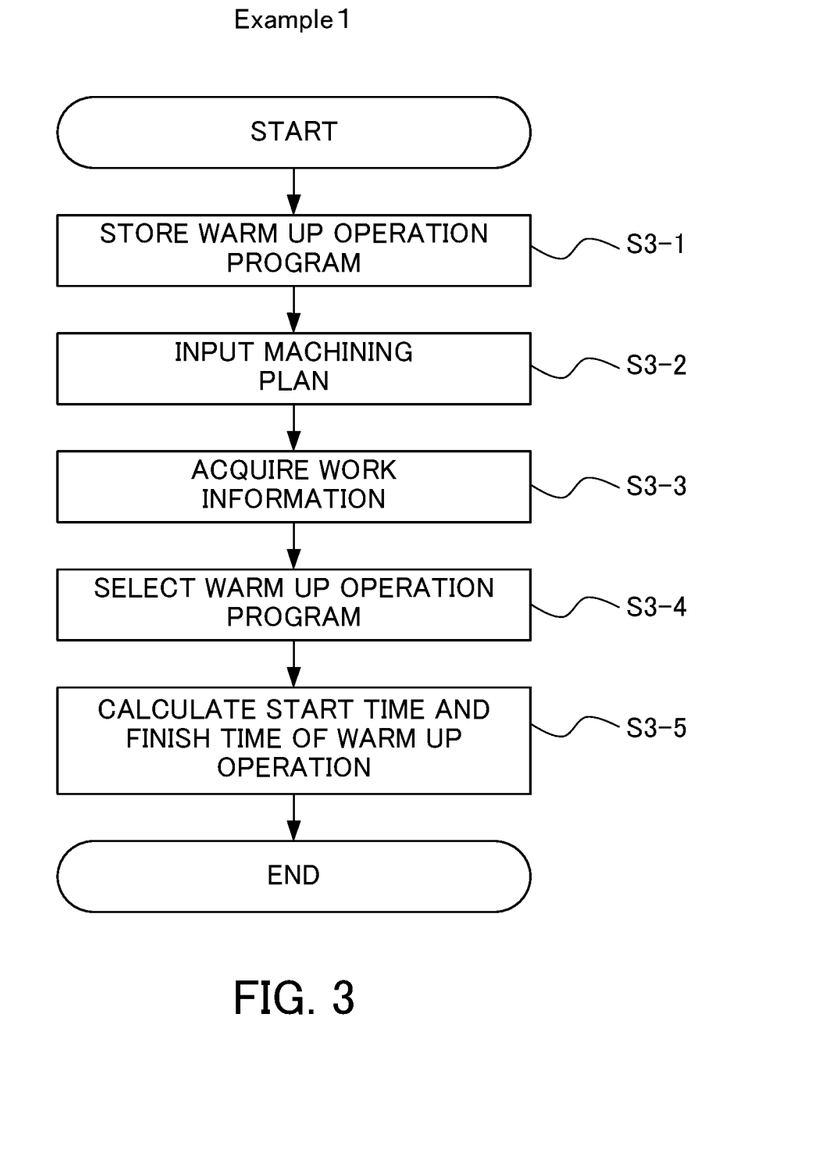
FIG. 3 is a flowchart showing behavior according to an example 1 of the present invention.

The following describes standard behavior of the warm up operation planning device 100 according to an example 1 based on a flowchart. FIG. 3 is a flowchart showing the behavior of the warm up operation planning device 100 according to the example 1. First, in step S3-1, the warm up operation planning device 100 stores a warm up operation plan to be used into the warm up operation program memory 208. As long as at least one warm up operation program is stored, the number of warm up operation programs to be stored is not limited. In step S3-2, the machining plan input unit 202 inputs a machining plan. In step S3-3, the warm up operation program selection unit 210 acquires work information contained in the input machining plan. In step S3-4, the warm up operation program selection unit 210 selects a warm up operation program for each edge (machine tool) based on the work information acquired in step S3-3. In step S3-5, the warm up operation planning unit 212 calculates start time and finish time of warm up operation based on the input machining plan and the selected warm up operation program, thereby generating a warm up operation plan. This behavior in step S3-5 will be described in detail as follows.

(1) Cycle time (warm up operation duration) is referenced based on the warm up operation program selected in step S3-4 described above. As described above, the cycle time (warm up operation duration) in the warm up operation program may be a default.

(2) Next, finish time of warm up operation at each edge is determined based on start time of machining operation at each edge contained in the input machining plan.

(3) Then, start time of the warm up operation is calculated based on the determined finish time of the warm up operation and the warm up operation duration in the warm up operation program.

The warm up operation planning unit 212 stores the warm up operation plan (warm up operation schedule) generated in this way into the warm up operation schedule memory 204. The warm up operation plan is generated in the foregoing way. Then, the warm up operation execution unit 224 makes a machine tool perform the warm up operation.

Example 2 (Second Calculation of Warm Up Operation Duration)

Figure 4:
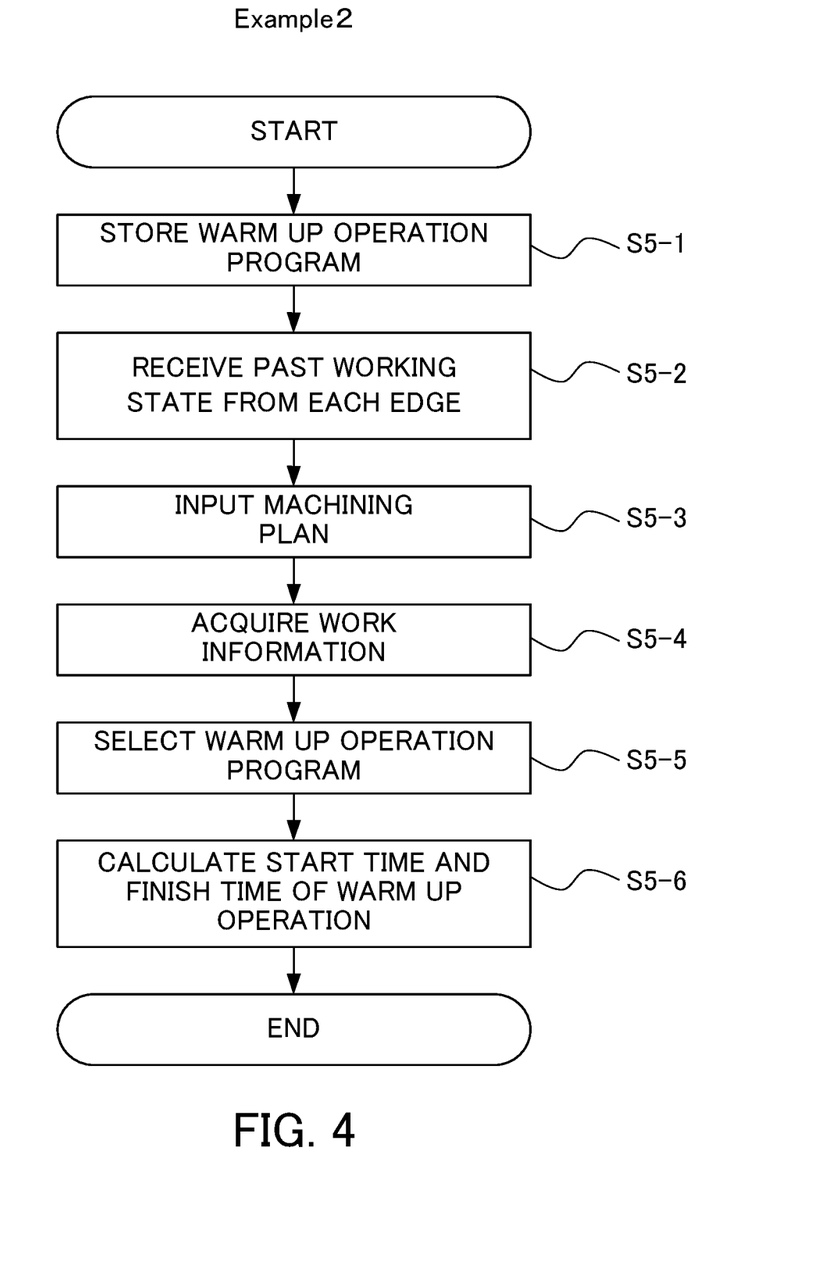
FIG. 4 is a flowchart showing behavior according to an example 2 of the present invention.

The following describes exemplary behavior of the warm up operation planning device 100 for calculating a warm up operation duration according to an example 2 based on a flowchart. FIG. 4 is a flowchart showing the behavior of the warm up operation planning device 100 according to the example 2. The exemplary behavior described in the example 2 is to determine an operation duration in a warm up operation program based on a past working state. In step S5-1, the warm up operation planning device 100 stores the warm up operation program to be used into the warm up operation program memory 208. In step S5-2, the warm up operation planning device 100 receives a past working state of each edge (such as a last working duration or a last power supply cutoff duration, for example) from each edge. For example, the warm up operation planning device 100 may receive a working state of each edge (in the past) from the mechanism unit 226, and record the received working state into the working state recording memory 218. The past working state may include a last (most recent) working state. The past working state may also include a working state before the most recent working state. In step S5-3, the machining plan input unit 202 inputs a machining plan. In step S5-4, the warm up operation program selection unit 210 acquires work information described in the input machining plan. In step S5-5, the warm up operation program selection unit 210 selects a warm up operation program for each edge based on the work information acquired in step S5-4. In step S5-6, the warm up operation planning unit 212 calculates start time and finish time of warm up operation based on the input machining plan and the selected warm up operation program, thereby generating a warm up operation plan. This behavior in step S5-6 will be described in detail as follows.

(1) A warm up operation duration is calculated in consideration of the last (most recent) working state and based on an operation duration in the warm up operation program selected in step S5-5. This calculation may be done by the warm up operation duration determination unit 222. As described above, the warm up operation duration may be calculated so as to be reduced further (from cycle time) with increase in a last (most recent) working duration and with reduction in a last (most recent) power supply cutoff duration, for example.

(2) Next, finish time of warm up operation is determined based on the input machining plan.

(3) Then, based on the determined finish time of the warm up operation and the warm up operation duration in the warm up operation program, start time of the warm up operation is calculated.

The warm up operation planning unit 212 stores the warm up operation plan (warm up operation schedule) generated in this way into the warm up operation schedule memory 204. The warm up operation plan is generated in the foregoing way. Then, the warm up operation execution unit 224 makes a machine tool perform the warm up operation.

Example 3 (Third Calculation of Warm Up Operation Duration)

Figure 5:
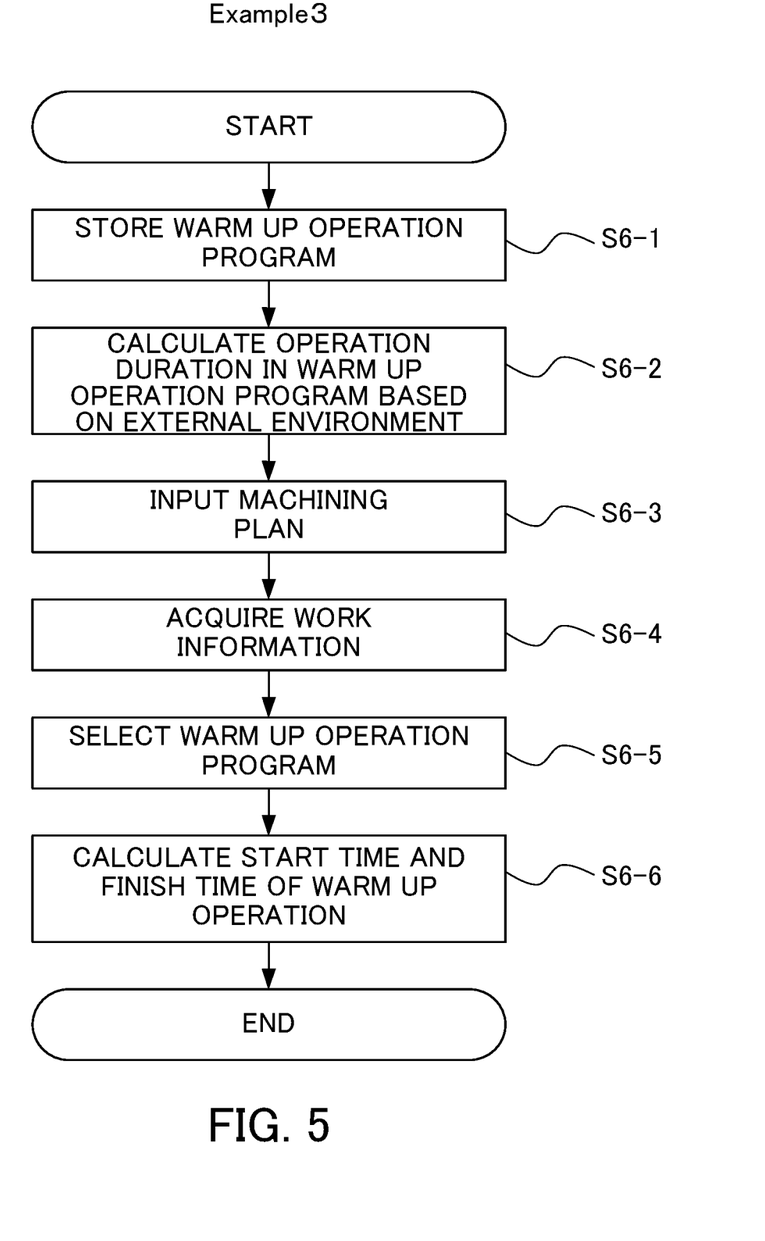
FIG. 5 is a flowchart showing behavior according to an example 3 of the present invention.

The following describes exemplary behavior of the warm up operation planning device 100 for calculating a warm up operation duration according to an example 3 based on a flowchart. FIG. 5 is a flowchart showing the behavior of the warm up operation planning device 100 according to the example 3. The exemplary behavior described in the example 3 is to determine an operation duration in a warm up operation program using external environment. In step S6-1, the warm up operation planning device 100 stores the warm up operation program to be used into the warm up operation program memory 208. In step S6-2, the warm up operation duration determination unit 222 calculates an operation duration in the warm up operation program based on external environment state information such as ambient temperature or coolant temperature as described above, for example. In step S6-3, the machining plan input unit 202 inputs a machining plan. In step S6-4, the warm up operation program selection unit 210 acquires work information and additional information described in the input machining plan. In step S6-5, the warm up operation program selection unit 210 selects a warm up operation program for each edge based on the work information and the additional information acquired in step S6-4. In step S6-6, the warm up operation planning unit 212 calculates start time and finish time of warm up operation based on the input machining plan and the selected warm up operation program, thereby generating a warm up operation plan. This behavior in step S6-6 will be described in detail as follows.

(1) A warm up operation duration in the warm up operation program selected in step S6-5 is calculated (set) based on external environment. For example, if ambient temperature or coolant temperature is higher than a predetermined threshold, a warm up operation duration may be reduced (from cycle time). In contrast, if the ambient temperature or the coolant temperature is lower than the predetermined threshold, the warm up operation duration may be set to be increased (from the cycle time).

(2) Next, finish time of warm up operation is determined based on the input machining plan.

(3) Then, based on the determined finish time of the warm up operation and the warm up operation duration in the warm up operation program, start time of the warm up operation is calculated.

The warm up operation planning unit 212 stores the warm up operation plan (warm up operation schedule) generated in this way into the warm up operation schedule memory 204. The warm up operation plan is generated in the foregoing way. Then, the warm up operation execution unit 224 makes a machine tool perform the warm up operation.

Example 4 (Correction of Warm Up Operation Duration)

Figure 6:
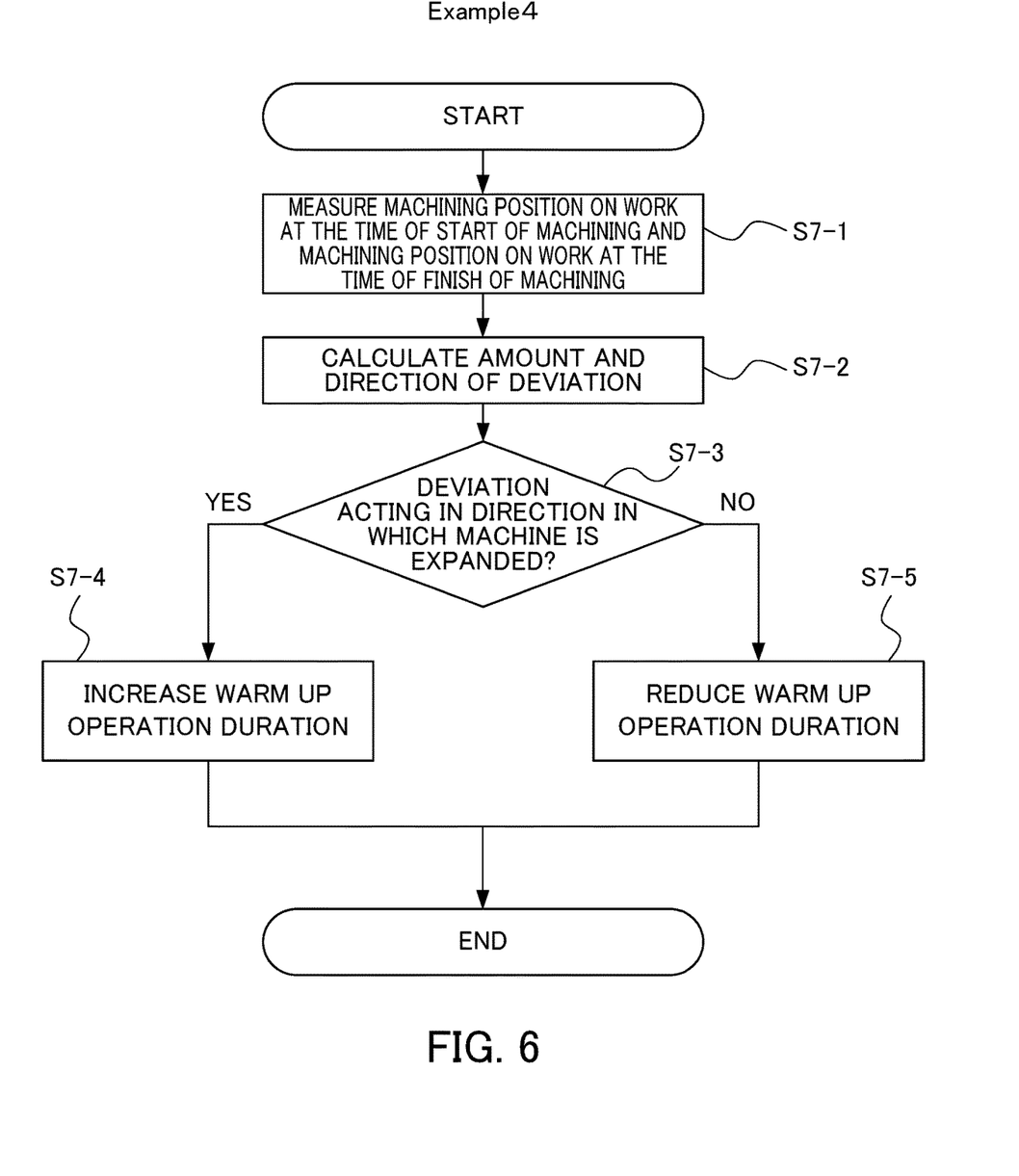
FIG. 6 is a flowchart showing behavior according to an example 4 of the present invention.

The following describes exemplary behavior of the warm up operation planning device 100 for correcting a warm up operation duration according to an example 4. The warm up operation planning device 100 according to this embodiment compares a machining position on a work at the time of start of machining operation and a machining position on the work at the time of finish of the machining operation, and corrects a warm up operation duration based on a result of the comparison. FIG. 6 is a flowchart showing the behavior of correcting a warm up operation duration. In step S7-1, a machining position on a work at an edge at the time of start of machining operation and a machining position on the work at the edge at the time of finish of the machining operation are measured. These positions are measured or calculated by the machine accuracy measurement unit 220, for example. The machine accuracy measurement unit 220 may store the measured machining positions on the work into internal storage means.

In step S7-2, the amount and direction of deviation are calculated between the machining position on the work at the edge at the time of start of the machining operation and the machining position on the work at the edge at the time of finish of the machining operation measured in step S7-1. These amount and direction are calculated by the machine accuracy measurement unit 220. In step S7-3, the machining position on the work at the edge at the time of start of the machining operation and the machining position on the work at the edge at the time of finish of the machining operation are compared. If the deviation at the time of finish of the machining operation acts in a direction in which a machine is expanded, the flow goes to step S7-4. If the deviation at the time of finish of the machining operation at the edge does not act in a direction in which the machine is expanded (if the deviation acts in a direction in which the machine is shrunk), the flow goes to step S7-5. This determination as to expansion or shrinkage based on the deviation in step S7-3 is made by the warm up operation duration determination unit 222. In step S7-4, as the deviation acts in the direction in which the machine is expanded, warm up operation is determined to be insufficient. Thus, correction is made so as to increase a warm up operation duration. This correction may be made by the warm up operation duration correction unit 223. This correction is made, for example, by correcting values in a table containing association between work information, a warm up operation program, and cycle time (a warm up operation duration in this warm up operation program). Specifically, this association table is corrected based on a difference between the amount of thermal displacement on a work machined immediately after warm up operation and the amount of thermal displacement on the work machined immediately before finish of a task. More specifically, at least the corrected cycle time is preferably recorded in association with the machine tool. In step S7-5, as the deviation acts in the direction in which the machine is shrunk not in the direction in which the machine is expanded, it is determined that warm up operation is being performed excessively. Thus, correction is made so as to reduce a warm up operation duration. This correction is also made by the warm up operation duration correction unit 223. Specific behavior in this correction is the same as the above-described behavior in step S7-4. Making this correction before generation of a warm up operation plan allows the warm up operation duration determination unit 222 to employ the corrected cycle time in generating a warm up operation plan.

Example 5 (Warm Up Operation Program Memory)

As described above, the warm up operation program memory 208 stores at least one warm up operation program. When a warm up operation program is to be stored into the warm up operation program memory 208, the operating range of a feed axis, the feed speed of the feed axis, the number of rotations of a main spindle, the rotation duration of the main spindle, the rotation direction of the main spindle, and operation timing of each axis in this warm up operation program may be changed in a manner that depends on a work to be machined. The warm up operation program memory 208 may store a warm up operation program in association with a work to be used.

Example 6 (Warm Up Operation Program Selection Unit 210)

As described above, the warm up operation program selection unit 210 selects a warm up operation program.

(a) For example, the warm up operation program selection unit 210 may select a warm up operation program from the warm up operation program memory 208 storing information about a work in a production plan and the warm up operation program in association with the work. In this case, the production plan may also be called a machining plan. This machining plan may be input by the machining plan input unit 202. In this case, a warm up operation program available for a general purpose without dependence on a work can be stored as a general-purpose warm up operation program into the warm up operation program memory 208. The type of a work to be machined may be acquired from the production plan (machining plan), and a warm up operation program associated with the acquired work is selectable. If the warm up operation program memory 208 does not contain a warm up operation program associated with the work acquired from the production plan (machining plan), the general-purpose warm up operation program is selectable.

(b) For example, the warm up operation program selection unit 210 may designate a warm up operation program in a production plan. In this case, the production plan may particularly be called an operation plan. This operation plan may be input by the operation plan input unit 206. In this case, a warm up operation program to be used may be read (selected) based on the production plan (operation plan). If there is a designated warm up operation program, the designated program is selectable. If there is no designated warm up operation program, the general-purpose warm up operation program is selectable.

<Effect>

As described above, this embodiment is capable of increasing production efficiency further by reducing downtime caused by warm up operation. Further, this embodiment is capable of contributing to reduction in power consumption by reducing excessive warm up operation.

<Modifications>

The behaviors in the above-described examples 1, 2, and 3 are to determine an operation duration in a warm up operation program by employing the respective methods. The processes in the examples 1, 2, and 3 may be used in combination. Further, by making the correction of a warm up operation duration in the above-described example 4 appropriately, an operation duration in a warm up operation program can be set to match actual conditions more correctly.

Each constituting unit in the above-described warm up operation planning device 100 can be realized by hardware, by software, or by a combination of hardware and software. A warm up operation planning method implemented by cooperation of the constituting units in the warm up operation planning device 100 can also be realized by hardware, by software, or by a combination of hardware and software. Being realized by software means being realized by reading and execution of programs by a computer.

The programs can be stored by using various types of non-transitory computer-readable media and can be supplied to a computer. The non-transitory computer-readable media include various types of tangible storage media. Examples of the non-transitory computer-readable media include magnetic recording media (flexible disk, magnetic tape, hard disk drive, for example), magneto-optical recording medium (magneto-optical disk, for example), a CD read-only memory (ROM), a CD-R, a CD-R/W, and semiconductor memories (mask ROM, programmable ROM (PROM), erasable PROM (EPROM), flash ROM, and random access memory (RAM), for example). The programs may be supplied to the computer using various types of transitory computer-readable media. Examples of the transitory computer-readable media include electrical signals, optical signals, and electromagnetic waves. The transitory computer-readable media can be used for supplying the programs to the computer through wire communication paths such as electrical wires and optical fibers, or radio communication paths.

While the embodiment of the present invention has been described in detail, the above-described embodiment merely shows specific examples of the implementation of the present invention. It should be noted that the technical scope of the present invention is not limited to the above-described embodiment. The present invention can be changed in various ways within a range not departing from the spirit of the invention, and these changes are also included in the technical scope of the present invention.

EXPLANATION OF REFERENCE NUMERALS 10, 100 Warm up operation planning device
12 warm up operation control unit
14 I/O unit
16 Timer
18 Warm up operation program memory
20 Warm up operation schedule memory
22 Time determination control unit
24 Mechanism drive control unit
26 Mechanism unit
28, 228 Bus
102 Past working state
104 Accuracy measurement result
106 Machined work accuracy measurement result
108 Production planning unit
110 Production plan
112, 112b Warm up operation program
114 Warm up operation duration
116 Warm up operation plan
200 Warm up operation plan output unit
202 Machining plan input unit
204 Warm up operation schedule memory
206 Operation plan input unit
208 Operation plan program memory
210 Warm up operation program selection unit
212 Warm up operation planning unit
214 Warm up operation duration determining parameter unit
216 External environment measurement unit
216b external environment recording memory
218 Working state recording memory
220 Machine accuracy measurement unit
222 Warm up operation duration determination unit
223 Warm up operation duration correction unit
224 Warm up operation execution unit
226 Mechanism unit
228 Bus

What is claimed is:

1. A warm up operation planning device that generates a warm up operation plan for a machine tool for machining on a work as a machining target, comprising:
    a warm up operation program memory in which association is recorded between at least one warm up operation program, information on a work to be machined by the machine tool, and cycle time in the warm up operation program;
    a working state recording memory in which at least a previous working duration of the machine tool is recorded;
    a machining plan input unit that inputs a machining plan for the work including information on the work;
    a warm up operation program selection unit that selects the warm up operation program recorded in the warm up operation program memory based on the machining plan;
    a warm up operation duration determination unit that calculates a warm up operation duration based on the cycle time in association with the warm up operation program selected by the warm up operation program selection unit;
    a warm up operation planning unit that generates a warm up operation plan for the machine tool by calculating start time and finish time of warm up operation based on the input machining plan and the warm up operation duration calculated by the warm up operation duration determination unit, wherein
    the warm up operation duration determination unit further calculates the warm up operation duration in consideration of a previous working duration of the machine tool recorded in the working state recording memory; and
    an operation duration correction unit that corrects the cycle time in the warm up operation program recorded in the warm up operation program memory in association with the warm up operation program.

2. The warm up operation planning device according to claim 1, comprising:
    an external environment measurement unit that acquires an external environment state of the machine tool; and
    an external environment recording memory in which the external environment state acquired by the external environment measurement unit is recorded, wherein
        the warm up operation duration determination unit calculates the warm up operation duration in consideration of the external environment state of the machine tool recorded in the external environment recording memory.

3. The warm up operation planning device according to claim 1, comprising:
   a machine accuracy measurement unit that measures machine accuracy of the work to be machined by the machine tool and stores a measurement result thereof, wherein the operation duration correction unit corrects the cycle time in the warm up operation program recorded in the warm up operation program memory in association with the warm up operation program based on the measurement result about the work measured by the machine accuracy measurement unit.

4. The warm up operation planning device according to claim 1, comprising: a warm up operation execution unit that performs warm up operation of the machine tool by following the warm up operation plan.

5. A warm up operation planning method of generating a warm up operation plan for a machine tool for machining on a work by using a computer,
   the computer comprising:
   a warm up operation program recording step of recording association between at least one warm up operation program, information on a work to be machined by the machine tool, and cycle time in the warm up operation program;
   a working state recording step of recording at least a previous working duration of the machine tool;
   a machining plan input step of inputting a machining plan for the work including information on the work;
   a warm up operation program selection step of selecting the warm up operation program recorded in the warm up operation program recording step based on the machining plan input by the machining plan input step;
   a warm up operation duration determination step of calculating a warm up operation duration based on the cycle time in association with the warm up operation program selected in the warm up operation program selection step;
   a warm up operation planning step of generating a warm up operation plan for the machine tool by calculating start time and finish time of warm up operation based on the machining plan input in the machining plan input step and the warm up operation duration calculated in the warm up operation duration determination step, wherein
   the warm up operation duration determination step further calculates the warm up operation duration in consideration of a previous working duration of the machine tool recorded in the working state recording step; and
   an operation duration correction step that corrects the cycle time in the warm up operation program recorded in the warm up operation program recording step in association with the warm up operation program.

6. The warm up operation planning device according to claim 1, wherein
   the operation duration correction unit
   makes correction so as to increase the cycle time, if deviation between a machining position on the work machined at start time of a machining operation and a machining position on the work machined at finish time of the machining operation by the machine tool acts in a direction in which the machine tool is expanded, or
   makes correction so as to reduce the cycle time, if deviation between a machining position on the work machined at start time of the machining operation and a machining position on the work machined at finish time of the machining operation acts in a direction in which the machine tool is shrunk.

* * * * *